(12) United States Patent  
Chen

(10) Patent No.: US 8,526,109 B1
(45) Date of Patent: Sep. 3, 2013

(54) PORTABLE PROJECTION SCREEN DEVICE

(75) Inventor: Corey Chen, New Taipei (TW)

(73) Assignee: Elite Screens Taiwan Co., Ltd. (TW)

( * ) Notice: Subject to any disclaimer, the term of this patent is extended or adjusted under 35 U.S.C. 154(b) by 0 days.

(21) Appl. No.: 13/538,612

(22) Filed: Jun. 29, 2012

(51) Int. Cl.
G03B 21/56 (2006.01)

(52) U.S. Cl.
USPC ........................................... 359/461

(58) Field of Classification Search
USPC ................... 359/461; 160/239–240
See application file for complete search history.

(56) References Cited

U.S. PATENT DOCUMENTS

| | | | |
|---|---|---|---|
| 3,592,255 A * | 7/1971 | Potter et al. ............. 160/24 |
| 4,416,511 A | 11/1983 | Weinberg |
| 5,274,499 A | 12/1993 | Shopp |
| 5,706,130 A * | 1/1998 | Rosen ...................... 359/443 |
| 6,191,886 B1 | 2/2001 | Sinkoff |
| 6,249,377 B1 | 6/2001 | Takamoto et al. |
| 6,297,905 B1 | 10/2001 | Takamoto et al. |
| 7,440,187 B2 | 10/2008 | Miyagawa et al. |
| 7,458,175 B2 | 12/2008 | Meyer et al. |
| 7,636,194 B2 | 12/2009 | Miyagawa et al. |
| 7,773,298 B2 | 8/2010 | Miyagawa et al. |
| 7,830,600 B2 | 11/2010 | Jiang |
| 7,907,337 B2 | 3/2011 | Daniel et al. |
| 2007/0002440 A1 | 1/2007 | Miyagawa et al. |
| 2007/0070500 A1 | 3/2007 | Meyer et al. |
| 2008/0239481 A1 | 10/2008 | Miyagawa et al. |
| 2008/0247041 A1 | 10/2008 | Miyagawa et al. |
| 2008/0259451 A1 | 10/2008 | Jiang |
| 2009/0190212 A1* | 7/2009 | Wang et al. ............... 359/461 |
| 2010/0007950 A1* | 1/2010 | Yuzawa ..................... 359/461 |
| 2011/0026114 A1 | 2/2011 | Abe et al. |
| 2011/0132557 A1* | 6/2011 | Kuroi et al. ............. 160/368.1 |

FOREIGN PATENT DOCUMENTS

TW M402443 4/2011

* cited by examiner

*Primary Examiner* — Christopher Mahoney
(74) *Attorney, Agent, or Firm* — WHGC, PLC; John F. O'Rourke

(57) ABSTRACT

A portable projection screen has a carrying frame, a movable frame, an elastically-rotating reel, a projection screen and two linkages. The carrying frame has a chamber communicating with an opening; the reel is coupled between two ends of the carrying frame in an elastically rotatable manner and is located in the chamber of the carrying frame; the projection screen is arranged via the opening between the movable frame and the carrying frame; the projection screen upper side connects to the movable frame and the lower side connects to the reel; the linkages arranged between the movable frame and the carrying frame, each linkage end respectively pivots to the movable frame and the carrying frame to form a first and a second pivoting part respectively; a third pivoting part is arranged between the two ends of each linkage; the pivoting parts of each linkage is provided an antislip structure.

12 Claims, 5 Drawing Sheets

PORTABLE PROJECTION SCREEN DEVICE

TECHNICAL FIELD

The invention relates to a projection screen device, in particular to a portable projection screen device which is convenient to carry and fixable at any time when deployed or retracted.

BACKGROUND

In recent years, with the popularity of the camera and the technology maturity of portable compact camera, the demand on the business presentation market is growing, and thus a portable projection screen device is needed.

A known portable projection screen device, such as the prior art shown in "An Improved Structure of a Portable Projection Screen" in Taiwan Publication No. M402443, comprises a first support frame, a second support frame, a projection screen and a linkage, wherein a reel is arranged inside the first support frame. Two sides of the projection screen are respectively connected to the second support frame and the reel. The projection screen is rolled on the reel, and the linkage consists of two links which are pivoted in a cross manner. The left ends of the two links are fixedly pivoted to the left ends of the first and second support frames respectively, and the right ends of the two links are respectively pivoted to the right half parts of the first and second support frames slidably back and forth, so that by means of the linkage the second support frame can be supported. The projection screen can be extended when the linkage is deployed. In reverse, the second support frame can be contracted and the projection screen can be rolled to stow the screen away. Besides, a fixing base and a sliding base which can be latched together are arranged inside the second support frame, and the upper ends of the two links are respectively connected to the fixing base and the sliding base so that the sliding base can be driven by the upper end of one of the links to be latched with the fixing base when the linkage is fully deployed, so as to achieve an effect of maintaining the fully deployed state of the linkage.

Although the prior art realizes a portable projection screen which can be deployed and retracted, the projection screen is not vertically adjustable, cannot be fixed at an intermediate position, and thus the projection screen has only one deploying size. Each time the projection screen is deployed, the sliding base must be latched with the fixing base to maintain the expanding state. After many repetitions of latching, the sliding base and the fixing base may malfunction or may be damaged. This is undesired by people seeking a product with long service life. Further, in the prior art, when the projection screen is to be retracted, the latching state between the sliding base and the fixing base first must be released, which may be troublesome. In addition, since prior art screens are not continuously adjustable, there is a risk that the second support frame would fall freely, injuring a user's hands. If the sliding base is not latched firmly with the fixing base, or if the user's hands fail to firmly hold the second support frame when the second support frame is raised to deploy or lowered to fold, injury also may result.

SUMMARY

Embodiments herein provide a portable projection screen device, which includes a carrying frame having a chamber and an opening which are communicated with each other; an elastically-rotating reel coupled between two ends of the carrying frame in an elastically rotatable manner and located in the chamber of the carrying frame; and a movable frame.

The portable projection screen device also includes a projection screen arranged between the movable frame and the carrying frame via the opening, the upper side of the projection screen being connected to the movable frame and the lower side being connected to the elastically-rotating reel; and at least two linkages arranged between the movable frame and the carrying frame, wherein two ends of each linkage are pivoted to the movable frame and the carrying frame to form a first pivoting part and a second pivoting part respectively. Further, the portable projection screen device can include at least a third pivoting part arranged between the two ends of each linkage; and an antislip structure provided with each of the first, second and third pivoting parts of each linkage.

In some embodiments, each linkage comprises a first link and a second link connected end-to-end; and a joint of the first link and the second link is pivoted as the third pivoting part. In others, the two linkages are arranged between the movable frame and the carrying frame without interference with each other. In still others, the two linkages are respectively arranged at a left half part and a right half part between the movable frame and the carrying frame.

In certain embodiments, the portable projection screen device can include an elastic element connected between the two linkages. The certain embodiments can be configured such that the two linkages are bent symmetrically to each other with respect to the at least a third pivoting part; the upper ends of the two linkages are pivoted to the movable frame apart from each other and the lower ends of the two linkages are pivoted to the carrying frame in proximity to each to other; and two ends of the elastic element are connected to the two linkages adjacent to the lower ends of the two linkages.

In some embodiments, the antislip structure is at least one wave washer. In certain other embodiments, the elastically-rotating reel comprises a reel body to which a projection screen is connected and rolled on, and a rotary spring inserted inside the reel body; and one end of the rotary spring is provided with an interfering element which is located in an interference way inside the reel body, while the other end of the rotary spring is fixedly connected to one of the two ends of the carrying frame. These embodiments may be configured so that the two ends of the carrying frame are respectively covered by a first end cover and a second end cover; the first end cover and the second end cover are respectively provided with a shaft; two ends of the reel body of the elastically-rotating reel can be movably coupled to the shafts of the first and second end covers respectively; and the other end of the rotary spring is fixedly connected to the shaft of the second end cover.

In addition, the two ends of the reel body of the elastically-rotating reel are respectively coupled with a sleeve; and the sleeves on two ends of the reel body can be movably axially mounted over the shafts of the first and second end covers respectively.

Also, provided is a portable projection screen device with a carrying frame having a chamber and an opening which are communicated with each other; an elastically-rotating reel coupled between two ends of the carrying frame in an elastically rotatable manner and located in the chamber of the carrying frame; a movable frame; a projection screen arranged between the movable frame and the carrying frame via the opening, the upper side of the projection screen being connected to the movable frame and the lower side being connected to the elastically-rotating reel; at least two linkages arranged between the movable frame and the carrying frame. The two ends of each linkage are pivoted to the movable frame and the carrying frame to form a first pivoting part and a second pivoting part respectively.

Also included are at least a third pivoting part arranged between the two ends of each linkage; at least one wave washer provided with each of the first, second and third pivoting parts of each linkage; and a coil spring connected between the two linkages. The two linkages are bent symmetrically to each other with respect to the at least a third pivoting part; the upper ends of the two linkages are pivoted to the movable frame apart from each other and the lower ends of the two linkages are pivoted to the carrying frame in proximity to each to other; two ends of the elastic element are connected to the two linkages adjacent to the lower ends of the two linkages. The portable projection screen device can be deployed on one of a desktop or a tabletop.

For a better understanding of the feature, characteristic and technical solution of the invention, please refer to the detailed description and the drawings below related to the invention. The drawings are only used for providing reference and description rather than limiting the invention.

BRIEF DESCRIPTION OF THE DRAWINGS

The invention is generally shown by way of reference to the accompanying drawings, FIG. 1 through FIG. 6 in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DETAILED DESCRIPTION OF THE EMBODIMENTS

Figure 1:
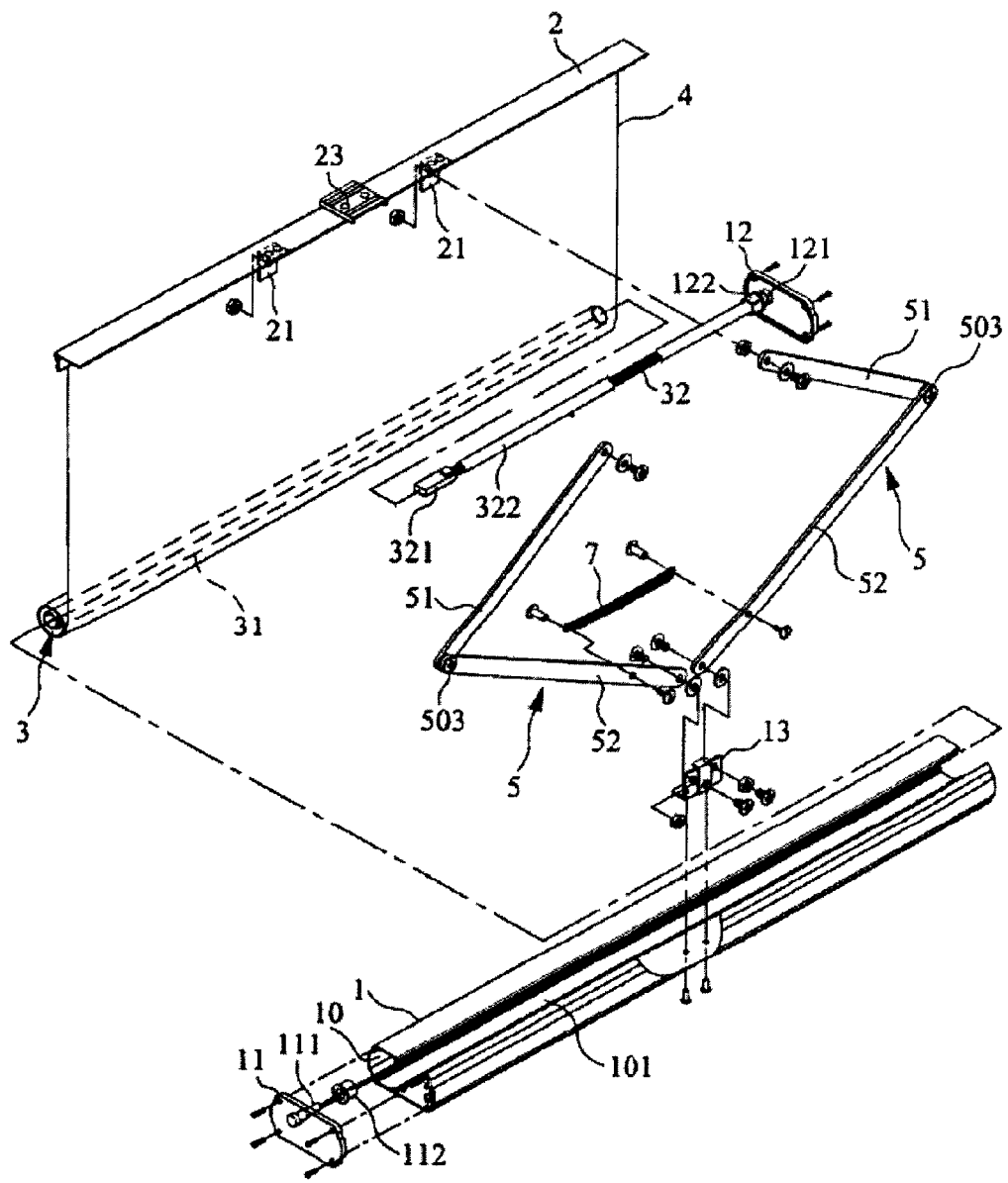
FIG. 1 shows an exploded perspective view of the projection screen device of the invention when viewed from back.
Figure 2:
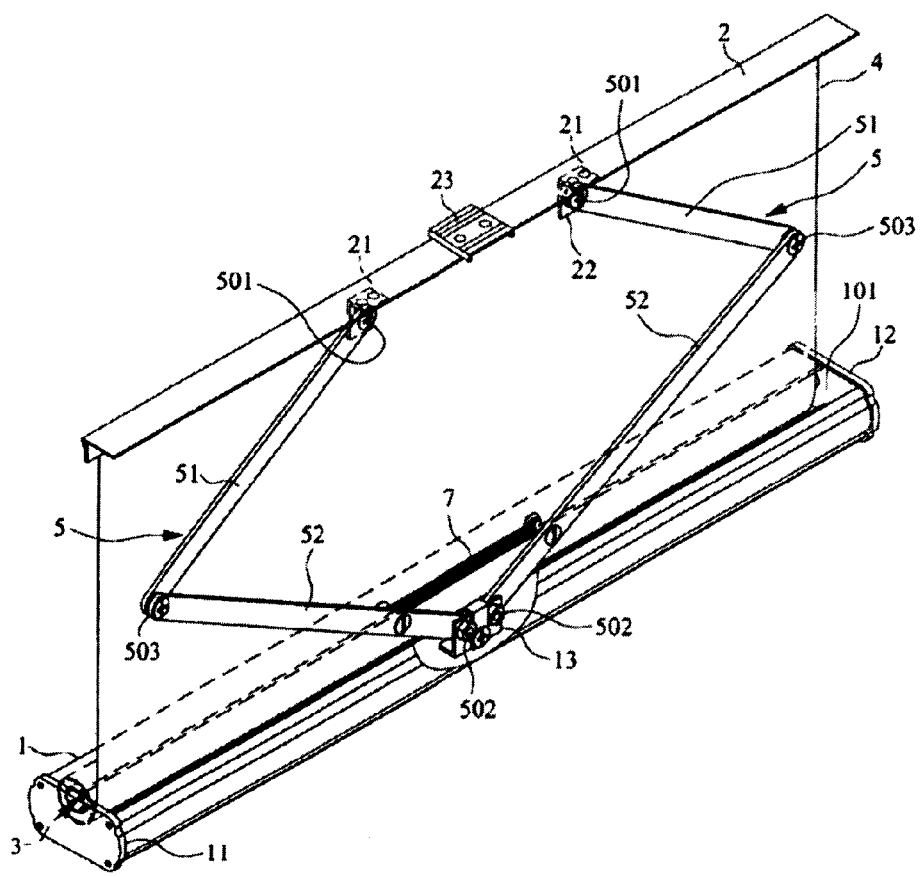
FIG. 2 shows an assembled perspective view of the projection screen device of the invention when viewed from back.

Referring to FIGS. 1 and 2, embodiments of the invention provide a portable projection screen device having a hollow carrying frame 1, a movable frame 2, an elastically-rotating reel 3, a projection screen 4 and at least two linkages 5, 5. The hollow carrying frame 1 has a chamber 10 and an opening 101 communicated with the chamber 10. The opening 101 is configured to allow the projection screen 4 to pass through, and to contain the movable frame 2 (as shown in FIGS. 2 and 6).

The elastically-rotating reel 3 can be coupled between two ends of the carrying frame 1 in an elastically rotatable manner (and the elastically-rotating reel 3 is located in the chamber 10 of the carrying frame 1 accordingly). A rotating reel is just one form of deployment means. As shown in FIG. 1, two ends of the carrying frame 1 are covered by a first end cover 11 and a second end cover 12, respectively. The first and second end covers 11, 12 are provided with shafts 111, 121 respectively; the elastically-rotating reel 3 can be movably coupled between the shafts 111, 121 of the first and second end covers 11, 12.

Figure 3:
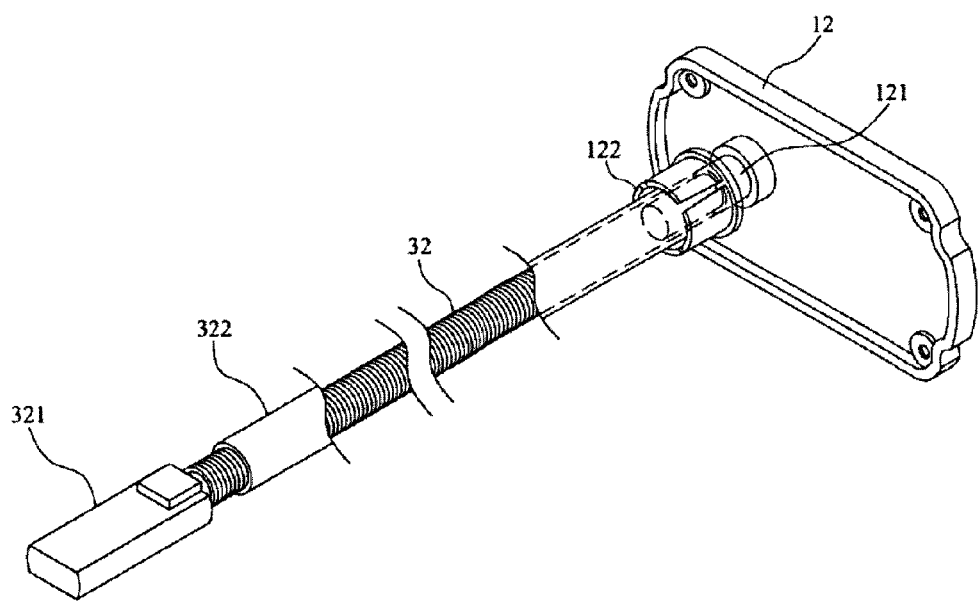
FIG. 3 shows a schematic perspective view between the second end cover and the rotary spring of the projection screen device of the invention.

The projection screen 4 is arranged between the movable frame 2 and the carrying frame 1 via the opening 101 of the carrying frame 1, wherein the upper side of the projection screen 4 is connected to the movable frame 2 and the lower side is connected to and rolled on the elastically-rotating reel 3. The projection screen may have a viewing length. Referring to FIG. 3, the elastically-rotating reel 3 includes a hollow reel body 31 to which the projection screen 4 is connected and rolled on, and a rotary spring 32 inserted inside the reel body 31. The two ends of the reel body 31 can be movably connected to the shafts 111, 121 of the first and second end covers 11, 12 respectively. One end of the rotary spring 32 can be provided with an interfering element 321, which is located in an interfering way inside the reel body 31.

Figure 6:
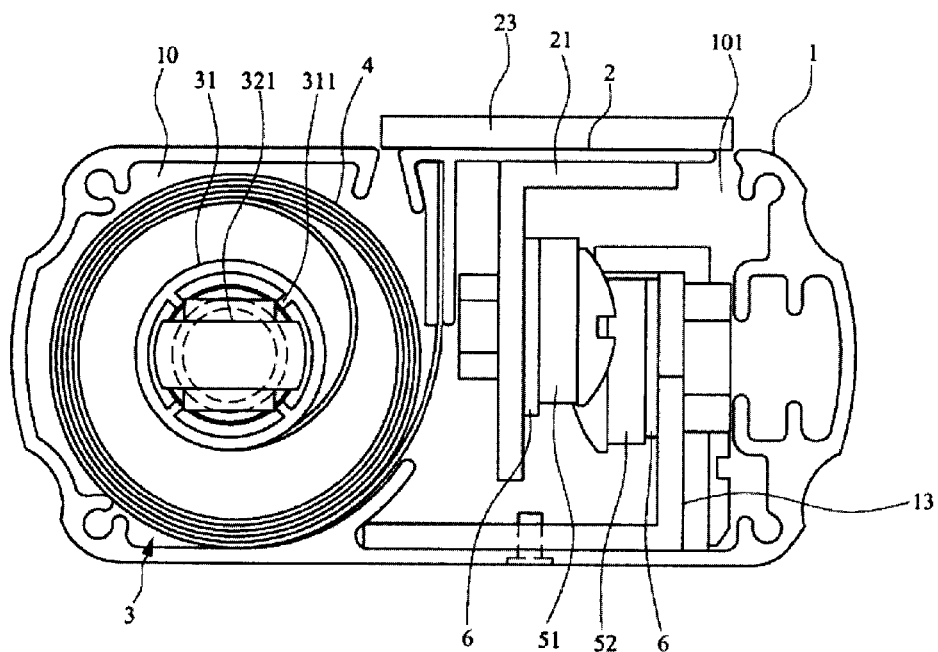
FIG. 6 shows a section view of the projection screen device of the invention when lowered to be fully retracted.

As shown in FIG. 6, a rib 311 can be located in an interfering way inside the reel body 31. The other end of the rotary spring 32 is fixedly connected to one of the two ends of the carrying frame 1, that is, to the shaft 121 of the second end cover 12 as shown in drawings. Therefore, by rotating the second end cover 12, the rotary spring 32 can be increasingly tensioned. When the spring is rotated to a suitable tension, the second end cover 12 then can be fixed to the end of the carrying frame 1, to keep the elastically-rotating force of the rotary spring 32. This achieves an effect of elastically winding the projection screen 4 in the chamber 10 of the carrying frame 1.

The two linkages 5, 5 are arranged between the movable frame 2 and the carrying frame 1 without interference with each other to provide support. For example, the two linkages 5, 5 are not crossed. As shown in the FIG. 2, the two linkages 5, 5 are respectively arranged at the left half part and the right half part between the movable frame 2 and the carrying frame 1. Two ends of each linkage 5 are respectively pivoted to the movable frame 2 and the carrying frame 1 to form a first pivoting part 501 and a second pivoting part 502 respectively (as shown in FIG. 2). At least a third pivoting part 503 is arranged between the two ends of each linkage 5.

Each of the respective first, second, and third pivoting parts 501, 502, 503 of each linkage 5 is provided with an antislip structure 6 (as shown in FIG. 6) though which the two linkages 5, 5 are adjustably fixable at any point when deployed or retracted, continuously along the usable length of the projection screen. In other words, the antislip structure can be configured to impart continuous vertical adjustability to the projection screen. In one non-limiting example, antislip structure 6, seen in FIG. 6, can be at least one wave washer, wave spring washer, a functional equivalent, or any other antislip structure, capable of improving the antislip effect. Specifically, because each of the respective first, second, and third pivoting parts 501, 502, 503 of each linkage 5 is provided with an antislip structure 6 which can improve the antislip effect, the deploying or retracting of the two linkages 5, 5 can be stopped at any height and fixed in place. Antislip structure 6 is configured to be less complex than some vertical adjustment devices, such as gas-pistons or opposing springs. Therefore the height of the screen 4 as deployed, or retracted, can be vertically adjustable for viewing. In all, the antislip function of structures 6 enables locking of the respective six pivoting parts (two first pivoting parts 501, two second pivoting parts 502, and two third pivoting parts 503). As a result, both of the two linkages 5, 5 and the projection screen 4 supported by the linkages would not lower to the original position when deployed under gravity, even if they are released when partially deployed or retracted. In other words, either the raising or the lowering of the movable frame 2 and the deploying or retracting of the two linkages 5, 5 are manually controlled. On the other hand, the winding of the projection screen 4 is conducted by the elastic rotation of the elastically-rotating reel 3, so that the projection screen can be elastically rolled back freely when the movable frame 2 is lowered and the two linkages 5, 5 are retracted.

The components describe above form the projection screen device of an embodiment, and thus the projection screen device is easy to carry and operate and can be stopped at any height and held in place there—the screen is fixable at any height in its range, without additionally requiring setting a sliding base and a fixing base which are troublesome features of the prior art.

In an embodiment, the projection screen device can further include an elastic element 7, seen in FIGS. 1, 2, 4, and 5. Elastic element 7, which may be a coil spring, can be connected between the two linkages 5, 5 to elastically pull the two linkages 5, 5 against moving outwards relatively when the movable frame 2 is lowered to be retracted, so as to improve the adjustably fixable at any time feature of the two linkages 5, 5. As shown in FIGS. 1, 2, 4, and 5, the two linkages 5, 5 are bent symmetrically relative to each other, and with respect to the third pivoting part 503.

Figure 4:
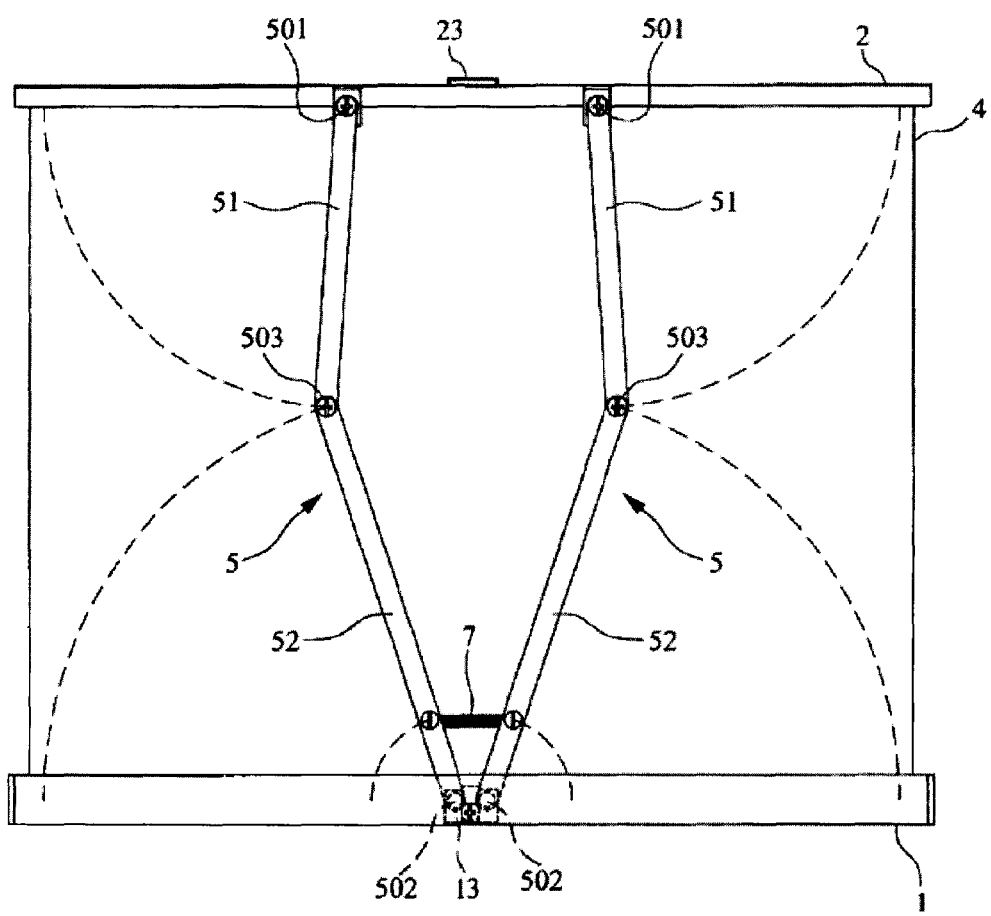
FIG. 4 shows a schematic rear view of the projection screen device of the invention when deployed.

As seen in FIGS. 1 and 2, the upper ends of the two linkages 5, 5 are pivoted to two pivoting elements 21, 21 of the movable frame 2 apart from each other, and the lower ends of the two linkages 5, 5 are pivoted to a base 13 inside the carrying frame 1 in proximity to each other. As shown in FIG. 2 and FIG. 4, the lower ends of the linkage are pivoted to two opposite positions of the base 13. Two ends of the elastic element 7 are connected to the two linkages 5, 5 at positions adjacent to the lower ends of the two linkages, respectively. The distance between said positions adjacent to the lower ends of the two linkages 5, 5 does not change greatly when the linkages rise to be deployed and lower to be retracted, and thus the force of elastic element 7 shown in drawings is applicable here, and it can be certain that the two linkages 5, 5 will be under the elastic force of the elastic element 7 during the whole processes of rising to be deployed and of lowering to be retracted.

Figure 5:
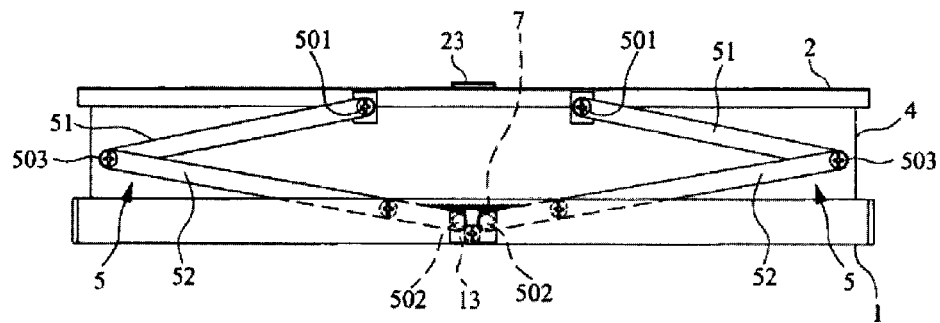
FIG. 5 shows a schematic view of the projection screen device of the invention when lowered to be fully retracted according to FIG. 4.

When deployed, as illustrated in FIGS. 4 and 5, the first link 51 rotates to stand upwardly around the first pivoting part 501, the second link 52 rotates to stand upright around the second pivoting part 502. As shown in FIG. 4, two third pivoting parts 503, 503 respectively draw an arc dash line at the upper side of the drawings. Also, as shown in FIG. 4, two third pivoting parts 503, 503 respectively draw an imaginary arc dashed line at the lower side of the drawing. When retracted, the two first links 51, 51 and the two second links 52, 52 are retracted downwards with opposite movements respectively. As shown in FIG. 4, said positions adjacent to the lower ends of the two linkages 5, 5 connected with the elastic spring 7 can respectively draw an imaginary small arc dashed line at the places near the carrying frame 1 of the drawing, when the two linkages 5, 5 are deployed or retracted.

As shown in FIGS. 1 and 3, the two ends of the reel body 31 of the elastically-rotating reel 3 are respectively provided with sleeves 112, 122. The sleeves 112, 122 on two ends of the reel body 31 can be movably axially mounted over the shafts 111, 121 of the first and second end covers 11, 12 respectively. A hollow sheath rod 322 can be mounted over the rotary spring 32 of the elastically-rotating reel 3. One sleeve 122 of the two sleeves is mounted over the sheath rod 322 in advance, and therefore when the rotary spring 32 is inserted into the reel body 31, the sleeve 122 can be coupled to one end of the reel body 31 at the same time.

In addition, as is seen in FIG. 4, each linkage 5 includes a first link 51 and a second link 52 connected end to end; the joint of the first link 51 and the second link 52 is pivoted as the third pivoting part 503. The movable frame 2 can be further provided with an operating part 23, so that the rising or lowering of the movable frame 2 can be achieved by operations of hands through the operating part 23.

In generally, the portable projection screen device of the invention has features as follows: by means of two specially-designed linkages 5, 5 and a special structure design related to the two linkages 5, 5, the portable projection screen device of the invention, in addition to having an effect of conveniently carrying and placement, has a continuously vertically adjustable effect (capable of being stopped at any height) when being retracted or deployed, unlike the prior art. Selected embodiments according to the present invention may be set up on a desktop or table top.

Further, the projection screen device embodiments have an effect of easy operation, that is: when the projection screen is deployed, it is not necessary to particularly cause the sliding base and the fixing base to be latched to each other; and when the projection screen is retracted, it is not necessary to release the latching state between the sliding base and the fixing base, and it is not necessary while the projection screen is deployed or retracted to firmly hold the movable frame 2 in the hands to avoid hand injury caused by the free falling of movable frame to the bottom, as with the prior art. By means of elastically-rotating reel 3, an effect of smoothly and elastically rolling back the projection screen 4 can be achieved.

The above are only the embodiments of the invention and are not intended to limit the scope of the invention. Any equivalent change on the structure made according to the description and the drawings of the invention are deemed to be included in the scope of the invention. Although the present invention has been described in terms of example embodiments, it is to be understood that neither the Specification nor the Drawings are to be interpreted as limiting. Various alternations and modifications are inherent, or will become apparent to those skilled in the art after reading the foregoing disclosure. It is intended that the appended claims be interpreted as covering all alternations and modifications that are encompassed by the spirit and the scope of the invention. Therefore, unless such changes and modifications depart from the scope of the present invention, they should be construed as being included therein.

What is claimed is:

1. A portable projection screen device comprising:
 a carrying frame having a chamber and an opening which are communicated with each other;
 an elastically-rotating reel coupled between two ends of the carrying frame in an elastically rotatable manner and located in the chamber of the carrying frame;
 a movable frame;
 a projection screen arranged between the movable frame and the carrying frame via the opening, the upper side of the projection screen being connected to the movable frame and the lower side of the projection screen being connected to the elastically-rotating reel;
 at least two linkages arranged between the movable frame and the carrying frame, wherein two ends of each linkage are pivoted to the movable frame and the carrying frame to form a first pivoting part and a second pivoting part respectively;
 at least a third pivoting part arranged between the two ends of each linkage; and an antislip structure provided with each of the first, second and third pivoting parts of each linkage, wherein the antislip structure imparts continuously vertical adjustability to the projection screen.

2. The portable projection screen device according to claim 1, further comprising an elastic element connected between the two linkages.

3. The portable projection screen device according to claim 2, wherein the two linkages are bent symmetrically to each other with respect to the at least a third pivoting part; the upper ends of the two linkages are pivoted to the movable frame apart from each other and the lower ends of the two linkages are pivoted to the carrying frame in proximity to each to other; and two ends of the elastic element are connected to the two linkages adjacent to the lower ends of the two linkages.

4. The portable projection screen device according to claim 1, wherein the antislip structure is at least one wave washer.

5. The portable projection screen device according to claim 1, wherein the elastically-rotating reel comprises a reel body to which a projection screen is connected and rolled on, and a rotary spring inserted inside the reel body; and one end of the rotary spring is provided with an interfering element which is located in an interference way inside the reel body, while the other end of the rotary spring is fixedly connected to one of the two ends of the carrying frame.

6. The portable projection screen device according to claim 5, wherein the two ends of the carrying frame are respectively covered by a first end cover and a second end cover; the first end cover and the second end cover are respectively provided with a shaft; two ends of the reel body of the elastically-rotating reel can be movably coupled to the shafts of the first and second end covers respectively; and the other end of the rotary spring is fixedly connected to the shaft of the second end cover.

7. The portable projection screen device according to claim 6, wherein the two ends of the reel body of the elastically-rotating reel are respectively coupled with a sleeve; and the sleeves on two ends of the reel body can be movably axially mounted over the shafts of the first and second end covers respectively.

8. The portable projection screen device according to claim 1, wherein each linkage comprises a first link and a second link connected end-to-end; and a joint of the first link and the second link is pivoted as the third pivoting part.

9. The portable projection screen device according to claim 1, wherein the two linkages are arranged between the movable frame and the carrying frame without interference with each other.

10. The portable projection screen device according to claim 1, wherein the two linkages are respectively arranged at a left half part and a right half part between the movable frame and the carrying frame.

11. A portable projection screen device comprising:
a carrying frame having a chamber and an opening which are communicated with each other;
an elastically-rotating reel coupled between two ends of the carrying frame in an elastically rotatable manner and located in the chamber of the carrying frame;
a movable frame;
a projection screen arranged between the movable frame and the carrying frame via the opening, the upper side of the projection screen being connected to the movable frame and the lower side being connected to the elastically-rotating reel;
at least two linkages arranged between the movable frame and the carrying frame, wherein two ends of each linkage are pivoted to the movable frame and the carrying frame to form a first pivoting part and a second pivoting part respectively;
at least a third pivoting part arranged between the two ends of each linkage;
at least one wave washer provided with each of the first, second and third pivoting parts of each linkage wherein the at least one wave washer imparts continuous vertical adjustability to the projection screen; and
a coil spring connected between the two linkages,
wherein the two linkages are bent symmetrically to each other with respect to the at least a third pivoting part; the upper ends of the two linkages are pivoted to the movable frame apart from each other and the lower ends of the two linkages are pivoted to the carrying frame in proximity to each to other; two ends of the elastic element are connected to the two linkages adjacent to the lower ends of the two linkages.

12. A method for a portable projection screen device, comprising:
providing a carrying frame having a chamber and an opening which are communicated with each other;
providing two ends on the carrying frame;
positioning an deployment means in the chamber of the carrying frame;
coupling the deployment means between the two ends of the carrying frame in an elastically rotatable manner;
arranging a projection screen having a viewing length between the movable frame and the carrying frame via the opening;
connecting an upper side of the projection screen to the movable frame;
connecting a lower side of the projection screen to the deployment means; arranging at least two linkages between the movable frame and the carrying frame, wherein the two ends of the linkage are pivoted to the movable frame and the carrying frame to form a first pivoting means and a second pivoting means, respectively;
providing at least a third pivoting means arranged between two ends of each linkage; and
providing an antislip means with each of the first, the second, and the third pivoting means of each linkage, wherein the antislip means imparts continuous vertical adjustability over the viewing length of the projection screen.

* * * * *